(12) United States Patent
Zhang et al.

(10) Patent No.: US 9,378,043 B1
(45) Date of Patent: Jun. 28, 2016

(54) MULTILAYER QUALITY OF SERVICE (QOS) FOR NETWORK FUNCTIONS VIRTUALIZATION PLATFORMS

(71) Applicant: Altera Corporation, San Jose, CA (US)

(72) Inventors: Jiefan Zhang, San Jose, CA (US); Alexander Kugel, High Wycombe (GB); Allen Chen, Cupertino, CA (US); Mark Jonathan Lewis, Marlow Bottom (GB); Abdel Hafiz Rabi, High Wycombe (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/724,089

(22) Filed: May 28, 2015

(51) Int. Cl.
*G06F 9/455* (2006.01)
*G06F 13/28* (2006.01)
*G06F 9/48* (2006.01)

(52) U.S. Cl.
CPC ........ *G06F 9/45558* (2013.01); *G06F 9/45533* (2013.01); *G06F 9/4881* (2013.01); *G06F 13/28* (2013.01); *G06F 2009/45579* (2013.01)

(58) Field of Classification Search
CPC ........................... G06F 9/4881; G06F 9/45533
USPC ............................................. 718/1, 102, 103
See application file for complete search history.

(56) References Cited

U.S. PATENT DOCUMENTS

| | | | |
|---|---|---|---|
| 7,843,926 B1 | 11/2010 | Muller et al. | |
| 8,923,328 B2 | 12/2014 | Kanda et al. | |
| 2003/0037089 A1* | 2/2003 | Cota-Robles | G06F 9/4881 718/1 |
| 2005/0193015 A1 | 9/2005 | Logston et al. | |
| 2009/0019442 A1* | 1/2009 | Liu | G06F 9/45533 718/102 |
| 2011/0154318 A1* | 6/2011 | Oshins | G06F 9/45537 718/1 |
| 2012/0246637 A1* | 9/2012 | Kreeger | H04L 45/54 718/1 |
| 2013/0132532 A1* | 5/2013 | Zhang | H04L 41/0823 709/220 |
| 2014/0133352 A1 | 5/2014 | Chapman | |
| 2014/0133497 A1 | 5/2014 | Chapman | |
| 2014/0201374 A1 | 7/2014 | Ashwood-Smith et al. | |
| 2014/0204957 A1 | 7/2014 | Kanda et al. | |
| 2014/0229945 A1 | 8/2014 | Barkai et al. | |
| 2014/0241247 A1 | 8/2014 | Kempf et al. | |

(Continued)

OTHER PUBLICATIONS

"Deploying Extremely Latency-Sensitive Applications in VMware vSphere 5.5" VM Ware, Oct. 10, 2013, 17 pages.

(Continued)

*Primary Examiner* — Phillip H Nguyen
(74) *Attorney, Agent, or Firm* — Treyz Law Group; Jason Tsai

(57) ABSTRACT

A virtualization platform for Network Functions Virtualization (NFV) is provided. The virtualization platform may include a host processor coupled to an acceleration coprocessor. The acceleration coprocessor may be a reconfigurable integrated circuit to help provide improved flexibility and agility for the NFV. The traffic at the NFV platform may be controlled by a distributed Quality of Service (QoS) manager. The distributed QoS manager may include multiple QoS modules each of which serves to perform priority queuing independently for its associated component or interface. For example, the NFV platform may include a first QoS module for arbitrating among multiple virtual machines, a second QoS module for performing priority queuing for data packets received at an external network port, a third QoS module for arbitrating among memory accesses at a coprocessor external memory interface, fourth QoS module for arbitrating accesses among multiple hardware acceleration slices, etc.

23 Claims, 9 Drawing Sheets

(56) References Cited

U.S. PATENT DOCUMENTS

| | | | |
|---|---|---|---|
| 2014/0317261 A1 | 10/2014 | Shatzkamer et al. | |
| 2014/0376555 A1* | 12/2014 | Choi | H04L 49/70 370/395.53 |
| 2015/0043383 A1 | 2/2015 | Farkas et al. | |
| 2015/0063166 A1 | 3/2015 | Sif et al. | |

OTHER PUBLICATIONS

Network Functions Virtualisation (NVF) NVF Performance & Portability Best Practises Network Functions Virtualisation (NVF) ETSI Industry Specification Group (ISG), Jun. 2014, 65 pages.

Chen et al., U.S. Appl. No. 14/609,306, filed Jan. 29, 2015.

Rabi et al., U.S. Appl. No. 14/698,636, filed Apr. 28, 2015.

* cited by examiner

MULTILAYER QUALITY OF SERVICE (QOS) FOR NETWORK FUNCTIONS VIRTUALIZATION PLATFORMS

BACKGROUND

The growth of the Internet has helped create a network of networks that link together billions of devices worldwide. Conventionally, the fastest and most reliable networks are built with custom application-specific integrated circuits (ASICs) and purpose-built hardware. As a result, large enterprise networks often resemble complex, monolithic systems. In such types of custom systems, adding features ad hoc and making changes to these systems while ensuring that the network does not experience any interruptions is very challenging.

Due to recent network focused advancements in commodity computing hardware, services that were previously only capable of being delivered by proprietary, application-specific hardware can now be provided using software running on commodity hardware by utilizing standard information technology (IT) virtualization techniques that run on high-volume server, switch, and storage hardware to virtualize network functions. By leveraging standard IT virtualization technology to consolidate different types of network equipment onto commercial "off-the-shelf" high volume servers, switches, and storage, network functions such as network address translation (NAT), firewalling, intrusion detection, domain name service (DNS), load balancing, and caching (just to name a few) can be decoupled from propriety hardware and can instead be run in software. This virtualization of network functions on commodity hardware is sometimes referred to as Network Functions Virtualization (NFV).

In an effort to develop a fully virtualized infrastructure, leading service providers have come together and created the European Telecommunications Standards Institute (ETSI) Industry Specification Group (ISG) for Network Functions Virtualization (NFV). This group has helped create the architecture and associated requirements for virtualizing various functions within telecommunications networks. Benefits of Network Functions Virtualization include reduced capital expenditure (i.e., by reducing the need to purchase purpose-built hardware), operating expenditure (i.e., by reducing space, power, and cooling requirements), reduced time-to-market (i.e., accelerated deployment), improved flexibility to address constantly changing demands, etc.

It is within this context that the embodiments described herein arise.

SUMMARY

A Network Functions Virtualization (NFV) platform is provided that includes a host processor coupled to a reconfigurable coprocessor serving as a hardware accelerator. The coprocessor may include virtual function hardware accelerators that serve to improve the performance for at least some virtual machine running on the host processor. In accordance with an embodiment, the NFV platform may be provided with a multilayer Quality of Service (QoS) manager having a plurality of independently operating QoS modules distributed throughout the host processor and coprocessor.

The coprocessor may include at least a first circuit (e.g., a direct memory access engine) that receives service requests from multiple virtual machines and a second circuit (e.g., an input-output circuit) that receives data packets from an external data port. The service requests from the multiple virtual machines may be scheduled using a virtual machine manager (VMM) QoS module, whereas traffic at the external data port may be managed using a network ingress/egress QoS module that operates independently from the VMM QoS module. In accordance with another embodiment, service requests from each virtual machine may be prioritized using a respective dedicated Class of Service (CoS) QoS module.

The DMA engine may also include a plurality of input queues that is managed using the VMM QoS module and a plurality of output queues that is managed using a data switch QoS module. The coprocessor may also include data switching circuitry that is coupled to the DMA engine and the input-output circuit and that communicates directly with the virtual function hardware accelerators. In particular, the communications with the virtual function hardware accelerators at the data switching circuitry may be managed using a hardware accelerator input/output QoS module. The coprocessor may further include a memory controller for communication with an external memory component, where memory access requests at the memory controller is prioritized using an external memory QoS module.

The VMM QoS module, the Class of Service QoS module(s), the network ingress/egress QoS module, the data switch QoS module, the hardware accelerator input/output QoS module, the external memory QoS module, and/or other QoS modules in the host processor and the coprocessor may be operated independently of one another to simultaneously handle access requests from multiple sources using the multilayer QoS manager in a hierarchical fashion to help satisfy the required network performance.

Further features of the present invention, its nature and various advantages will be more apparent from the accompanying drawings and the following detailed description.

DETAILED DESCRIPTION

Embodiments of the present invention relate to Network Functions Virtualization (NFV) and more particularly, to hardware acceleration for NFV. It will be recognized by one skilled in the art, that the present exemplary embodiments may be practiced without some or all of these specific details. In other instances, well-known operations have not been described in detail in order not to unnecessarily obscure the present embodiments.

Conventionally, complex networks are built using fragmented, non-commodity hardware. When expanding or upgrading the network, new application-specific hardware needs to be installed, which not only increases deployment costs for existing vendors but also presents a large barrier to entry for new vendors, limiting innovation and competition.

In an effort to accelerate the deployment of new network services to satisfy the ever-increasing consumer demand for improved network speed and reliability, vendors (e.g., telecommunications operators or service providers such AT&T, Verizon, British Telecom, etc.) have come together and created the European Telecommunications Standards Institute (ETSI) Industry Specification Group (ISG). The ETSI ISG has since introduced virtualization technologies that can be applied to networking technologies to create a more intelligent and more agile service infrastructure. This concept of running network functions such as those performed traditionally by application-specific routers, firewalls, load balancers, content delivery networks (CDN), broadband network gateways (BNG), network address translators (NAT), domain name systems (DNS), and other networking devices in software on commodity hardware is sometimes referred to as Network Functions Virtualization (NFV).

Figure 1:
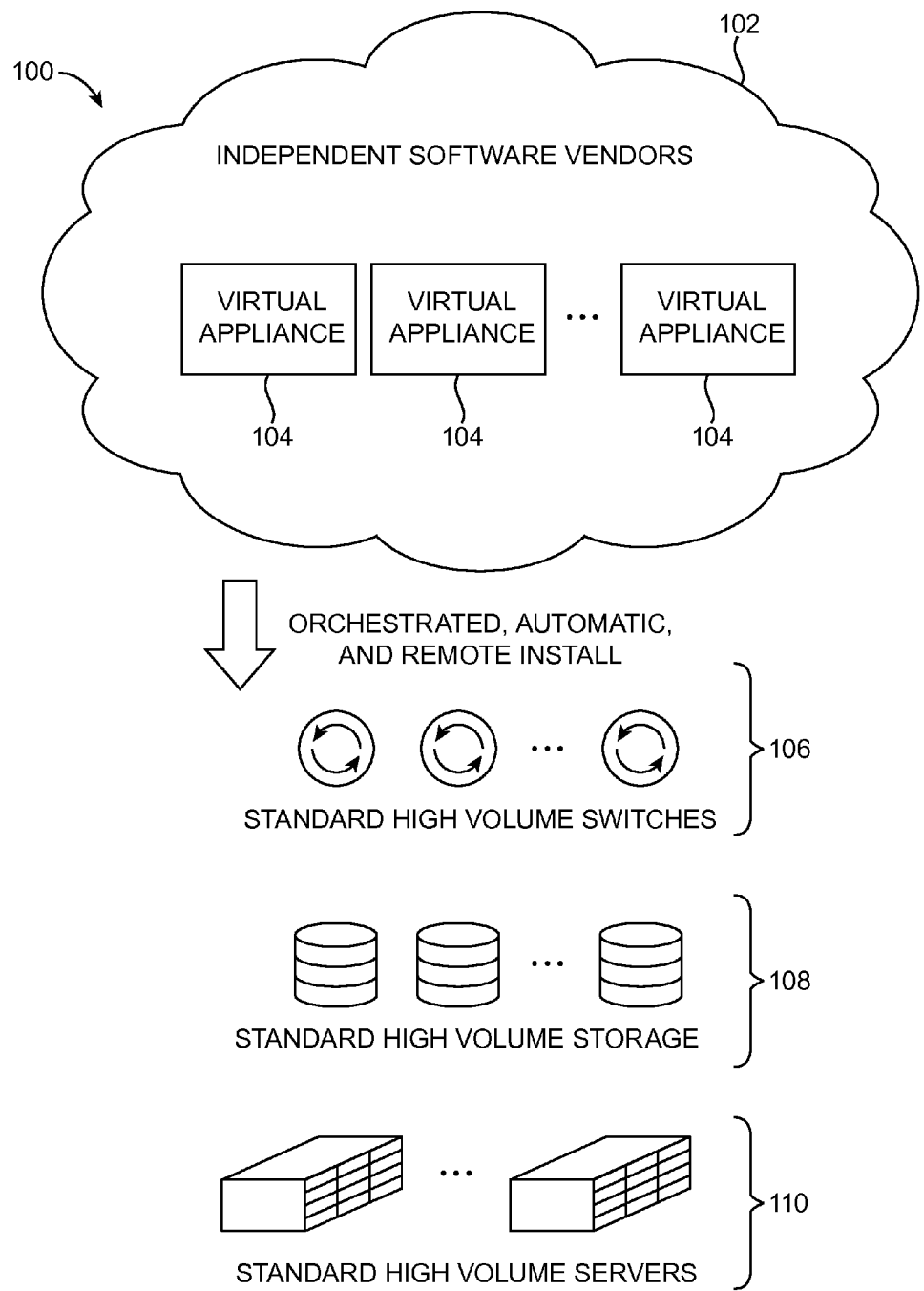
FIG. 1 is a diagram illustrating Network Functions Virtualization (NFV) in accordance with an embodiment.

The concept of Network Functions Virtualization is illustrated in FIG. 1. As shown in system 100 in FIG. 1, NFV allows services offered by a plurality of independent vendors to run separately on one or more virtual appliances 104 in a cloud 102. Effectively, the network services offered by the different software vendors can be implemented using virtual appliances 104 running on commercial off-the-shelf hardware, which includes but is not limited to standard high volume switches 106, standard high volume storage 108, and standard high volume servers 110 (e.g., the network functions can be orchestrated and remotely installed on commodity physical infrastructure rather than on more expensive purpose-built manufacturer-designed hardware).

Shifting different network components to commodity hardware helps to eliminate use of more costly, specialized hardware for different applications onsite and therefore helps to eliminate wasteful overprovisioning and can substantially reduce capital expenditure. Virtualization of the overall infrastructure also helps to streamline the operational processes and equipment that are used to manage the network. Since all the services are run on the same commodity hardware, datacenter operators no longer need to support multiple vendor and hardware models, thereby simplifying the base hardware support/management and providing a unified infrastructure that allows for automation and orchestration within and among different services and components.

For example, network administrators can coordinate (within the NFV framework) resource availability and automate the procedures necessary to make the services available, which reduces the need for human operators to manage the process and therefore reduces the potential for error. Moreover, NFV can also help reduce the time to deploy new networking services with minimal disruption to the network infrastructure to help seize new market opportunities and to improve return on investments (ROI) on new services while providing enhanced agility and flexibility by allowing the services to be quickly scaled up or down in software to address customer demands. If desired, NFV may be implemented in conjunction with the Software Defined Networking (SDN) approach that separates the network's control and forwarding planes to provide a more centralized view of the distributed network for a more efficient orchestration and automation of network services.

In general, there may be at least two different types of network function virtualization platforms including a native "bare metal" virtualization implementation and a "hosted" virtualization implementation. Bare metal virtualization involves installing a hypervisor (i.e., a computer software that creates and runs one or more virtual machines) as the first operating system on a host machine, whereas the hosted virtualization involves installing the hypervisor on top of an already live operating system (i.e., a host OS) running on the host machine. Bare metal virtualization offers direct access to the hardware resources on the host machine and is often used for enterprise solutions. On the other hand, hosted virtualization can only access the hardware through the host OS but allows running of multiple guest operating systems and is therefore often used for desktop solutions.

In general, the hosted implementation exhibits increased latency and a relatively wider statistical spread in the mean response time compared to the bare metal implementation. This increase in latency and variability for the hosted implementation may be due to contention created by the sharing of resources and also overhead associated with extra networking layers that are required for processing among multiple guest operating systems.

In an effort to provide improved performance predictability, datacenter operators (e.g., network orchestrators such as Microsoft, Google, and Amazon, just to name a few) provide resource availability description (RAD) for generic central processing units (e.g., CPUs within equipment 106, 108, and 110 of FIG. 1 that are being used to implement the virtual appliances). The resource availability description, however, only provides local information such as the CPU speed and the amount/type of local storage but does not specify how well the CPU interacts with external components.

Figure 2:
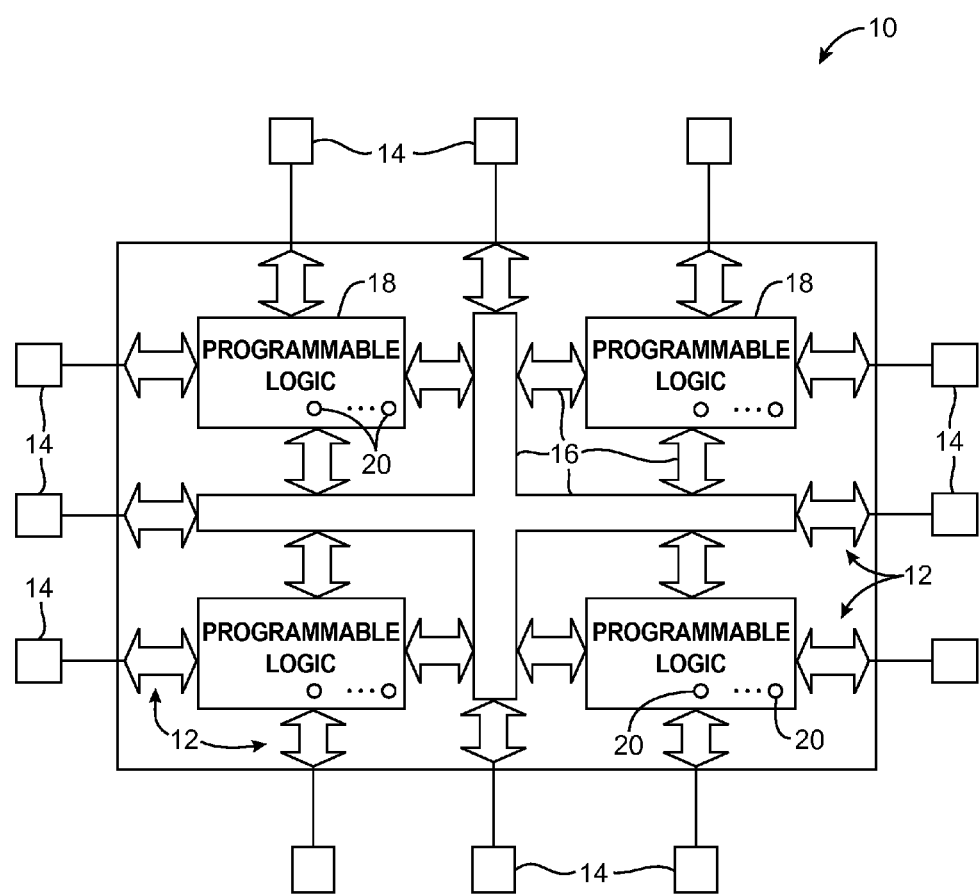
FIG. 2 is a diagram of an illustrative programmable integrated circuit in accordance with an embodiment.

To further enhance the achievable speed of the virtualized networks, a commodity CPU may be coupled to a hardware accelerator or a "coprocessor." In accordance with an embodiment, the hardware accelerator may be a programmable integrated circuit such as a programmable logic device (PLD). An illustrative integrated circuit of the type that may be used as a hardware accelerator is shown in FIG. 2. As shown in FIG. 2, integrated circuit 10 may contain memory elements 20. Memory elements 20 may be loaded with configuration data to configure programmable transistors such as pass transistors (sometimes referred to as pass gates or pass gate transistors) in programmable circuitry (programmable logic) 18.

Because memory elements 20 may be used in storing configuration data for programmable logic 18, memory elements 20 may sometimes be referred to as configuration random-access memory elements (CRAM). Integrated circuit 10 may be configured to implement custom logic functions by configuring programmable logic 18, so integrated circuit 10 may sometimes be referred to as a programmable integrated circuit.

As shown in FIG. 1, programmable integrated circuit 10 may have input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include fixed interconnects (conductive lines) and programmable interconnects (i.e., programmable connections between respective fixed interconnects).

Programmable logic 18 may include combinational and sequential logic circuitry. Programmable logic 18 may be configured to perform a custom logic function. The programmable interconnects associated with interconnection resources 16 may be considered to form a part of programmable logic 18.

When memory elements 20 are loaded with configuration data, the memory elements each provide a corresponding static control output signal that controls the state of an associated logic component in programmable logic 18. The memory element output signals may, for example, be used to control the gates of metal-oxide-semiconductor (MOS) transistors such as n-channel metal-oxide-semiconductor (NMOS) pass transistors in programmable components such as multiplexers, logic gates such as AND gates, NAND gates, etc. P-channel transistors (e.g., a p-channel metal-oxide-semiconductor pass transistor) may also be controlled by output signals from memory elements 20, if desired. When a memory element output that is associated with an NMOS pass transistor is high, the pass transistor controlled by that memory element is turned on and passes logic signals from its input to its output. When the memory element output is low, an NMOS pass transistor is turned off and does not pass logic signals. P-channel metal-oxide-semiconductor (PMOS) pass transistors are turned on when the signal that is applied to its gate from the output of a memory element is low (e.g., 0 volts) and are turned off when the output of the memory element is high (i.e., the polarity for NMOS and PMOS control signals is reversed).

Configuration random-access memory elements 20 may be arranged in an array pattern. There may be, for example, millions of memory elements 20 on integrated circuit 10. During programming operations, the array of memory elements is provided with configuration data. Once loaded with configuration data, memory elements 20 may selectively control (e.g., turn on and off) portions of the circuitry in the programmable logic 18 and thereby customize the circuit functions of circuit 10.

The circuitry of programmable integrated circuit 10 may be organized using any suitable architecture. As an example, the circuitry of programmable integrated circuit 10 may be organized in a series of rows and columns of programmable logic blocks (regions) each of which contains multiple smaller logic regions. The logic resources of integrated circuit 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the circuitry of programmable integrated circuit 10 may be arranged in more levels or layers in which multiple large regions are interconnected to form still larger portions of logic. Still other device arrangements may use logic that is not arranged in rows and columns.

The example of FIG. 2 in which device 10 is described as a programmable integrated circuit is merely illustrative and does not serve to limit the scope of the present invention. The method and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), just to name a few.

Figure 3:
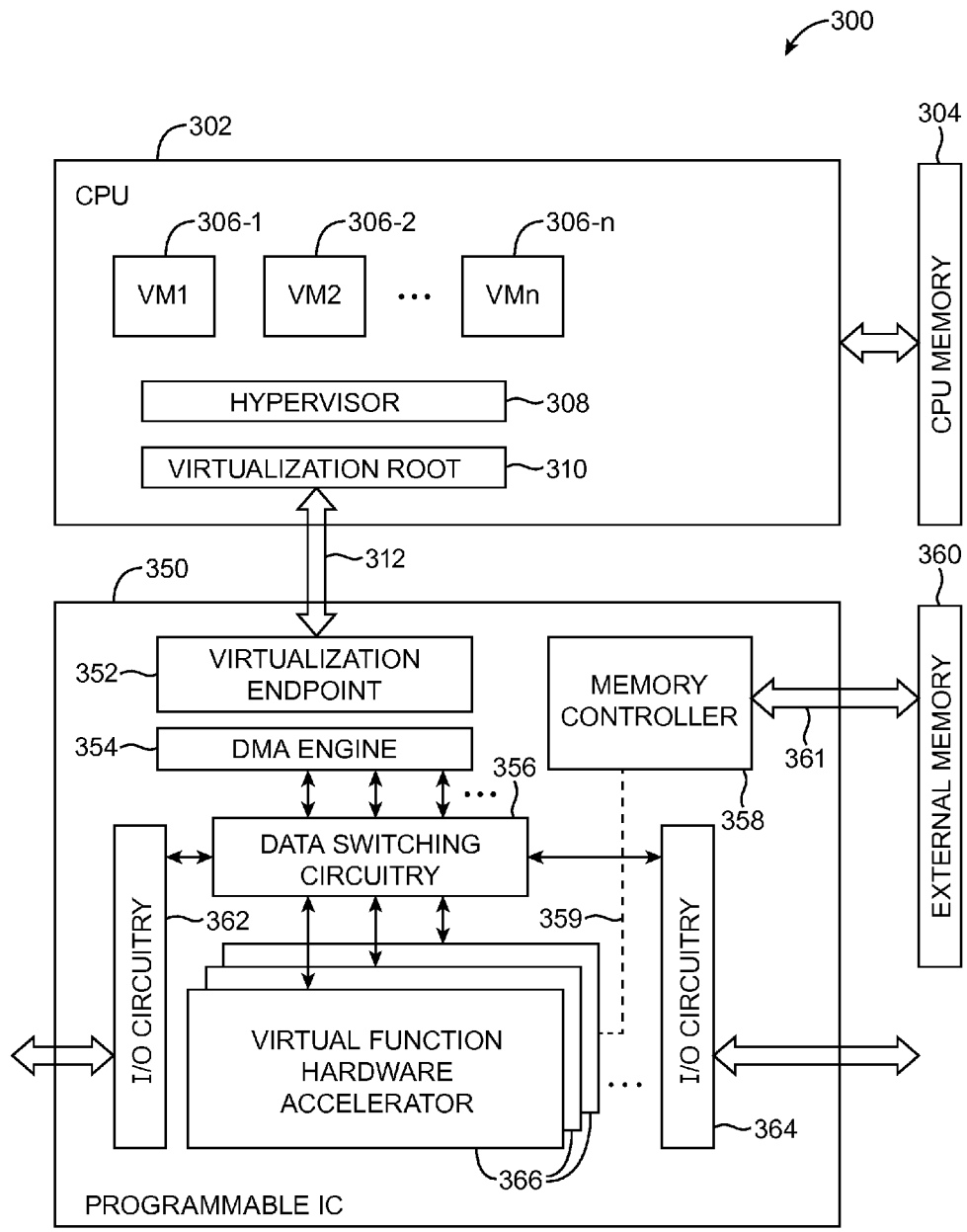
FIG. 3 is a diagram of an illustrative NFV platform that includes a central processing unit (CPU) coupled to a programmable hardware accelerator in accordance with an embodiment.

FIG. 3 is a diagram on an illustrative NFV platform 300 where a central processing unit (CPU) 302 is coupled to a hardware accelerator coprocessor such as a programmable integrated circuit 350. As shown in FIG. 3, software/firmware running on CPU 302 may include at least a hypervisor 308 and N associated virtual machines 306 (e.g., virtual machines 306-1, 306-2, . . . , 306-n) and a virtualization root 310. CPU 302 on which hypervisor 308 is installed may be referred to as the "host machine."

As described above, hypervisor 308 may serve as a virtual machine monitor (VMM) that runs one or more virtual machines 306 on a server. Each virtual machine 306 may be referred to as a "guest machine" and may each run a guest operating system (OS). The hypervisor presents the guest operating systems with a virtual operating platform and manages the execution of the guest operating systems while sharing virtualized hardware resources. Hypervisor 308 may run directly on the host's hardware (as a type-1 bare metal hypervisor) or may run on top of an existing host operating system (as a type-2 hosted hypervisor). If desired, additional paravirtualization drivers and tools (not shown) may be used to help each guest virtual machine communicate more efficiently with the underlying physical hardware. CPU 302 is also operable to communicate directly with an off-chip host memory 304. In yet other suitable embodiments, CPU 302 may be configured to communicate with network cards, disk drive controllers, graphics cards, sound cards, etc.

In the example of FIG. 3, root 310 may serve as a root complex that interfaces with a corresponding virtualization endpoint 352 in accelerator 350 using the Peripheral Component Interconnect Express (PCIe) standard. In a PCIe system, a root complex may refer to a device configured to connect a CPU to other PCIe endpoints and/or PCIe switches to which PCIe endpoints and other types of endpoints may be connected. A root complex is typically implemented with a full PCIe protocol stack that includes the transaction layer, data link layer, and physical layer. The use of a PCIe bus to connect CPU 302 and coprocessor 350 is merely illustrative. If desired, other types of input-output interface technologies can be used, including the Industry Standard Architecture (ISA) bus standard, the Micro Channel Architecture (MCA) bus standard, the Video Electronics Standards Association Local Bus (VESA) bus standard, the legacy PCI bus standard, the Accelerated Graphics Port (AGP) bus standard, the Universal Serial Bus (USB) standard, the Universal Asynchronous Receiver/Transmitter (UART) bus standard, etc.

Still referring to FIG. 3, software/firmware running on coprocessor 350 may also include at least a memory controller 358 (e.g., a memory controller for interfacing with external memory 360 that is directly coupled to coprocessor 350), a direct memory access (DMA) engine 354, data switching circuitry 356, input/output (IO) components 362 and 364, and one or more virtual function hardware accelerators 366.

Each accelerator 366 may serve to provide hardware acceleration for one or more of the virtual machines 306 running on host processor 302. Components 362 and 364 may serve as ingress and/or egress interfaces for communicating with other IO devices that are coupled to coprocessor 350. Data switching circuitry 356 may be configured to route data among the accelerators 366, IO components 362 and 364 and DMA engine 354. Direct memory access engine 354 may be configured to route data from the host CPU memory 304 to coprocessor 350. Accelerators 366 may also be able to communicate directly with memory controller 358 via path 359.

NFV systems with hardware acceleration can sometimes have multiple sources that exhibit varying priorities and that target potentially common destinations. As an example, each of the multiple virtual machines in the host processor may exhibit its own set of priority requirements. As another example, each packet received at the IO components of the coprocessor may have its own priority criteria. One or more such types of requesters may try to simultaneously access the virtual function accelerators in the coprocessor. A conventional Quality of Service (QoS) manager that handles traffic at only a single interface for the NFV system is, however, incapable of handling virtualization with multiple VM accesses and external port accesses simultaneously. It would therefore be desirable to provide an improved QoS scheme that is capable of managing access requests of varying priorities from different sources.

In accordance with an embodiment of the present invention, a multilayer QoS management module is provided that allows inputs from different sources to be separately prioritized. In particular, the system level QoS module does not exist in a single discrete traffic manager but rather is distributed across multiple layers throughout the NFV platform.

Figure 4:
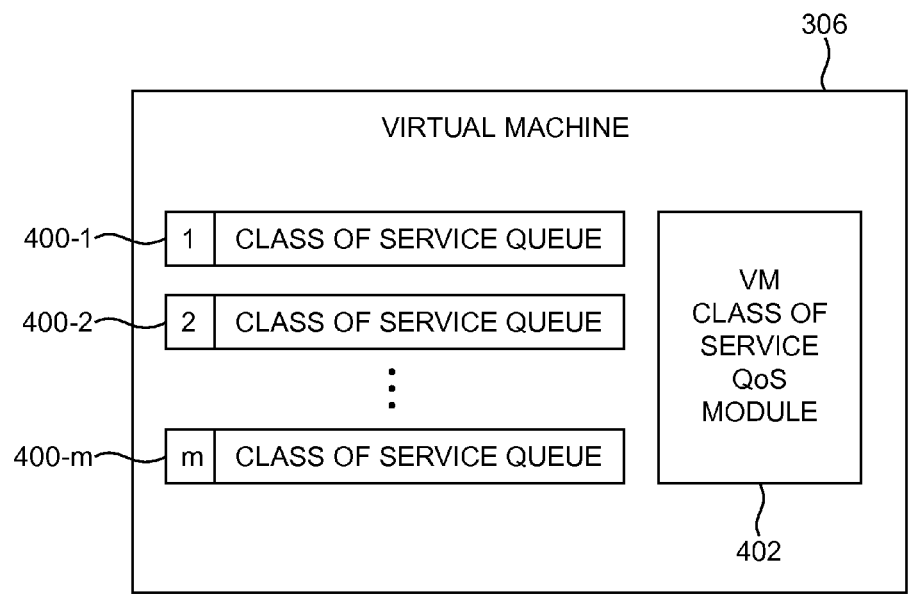
FIG. 4 is a diagram showing how a virtual machine can be provided with an illustrative Class of Service (CoS) Quality of Service (QoS) module in accordance with an embodiment.

FIG. 4 is a diagram showing how a virtual machine 306 (e.g., one of the virtual machines running on the host processor of FIG. 3) can include multiple class of service (CoS) queues. As shown in FIG. 4, virtual machine 306 may include a first CoS queue 400-1, a second CoS queue 400-2, ..., and an $m^{th}$ CoS queue 400-m. As the name may suggest, each of the m queues 400 may serve to enqueue requests from a different Class of Service. Unlike QoS traffic management (which is generally used to guarantee a level of service in terms of bandwidth and delivery time), Class of Service may refer to a way of managing network traffic by grouping similar types of traffic together and treating each type as a class with its own service priority level. For example, voice service requests may be fed to a first CoS queue; data service requests may be fed to a second CoS queue; video service requests may be fed to a third CoS queue; email service requests may be fed to a fourth CoS queue; large document transfer requests may be fed to a fifth CoS queue, just to name a few. These examples are merely illustrative. Each of the virtual machines in the host processor may be used to process requests from any suitable types of services.

Still referring to FIG. 4, virtual machine 306 may be provided with a virtual machine (VM) Class of Service QoS module 402 (e.g., each of the virtual machines in the host processor may be provided with its own dedicated CoS QoS module). In accordance with an embodiment, the VM CoS QoS module 402 may be used to prioritize the different classes of services in the virtual machine. For example, module 402 may determine that the queue having the voice service requests be given the highest priority, that the queue having the video service requests be given the second highest priority, and that the queue having the data service requests be given the third highest priority. It might also be worth noting that the priority decision, although determined locally by the VM CoS QoS Module 402 within the virtual machine, is effectively realized by the scheduling algorithm at the DMA engine of the coprocessor. In general, the CoS QoS module 402 within each of the virtual machines in the host processor is able to independently prioritize the different queues 400 within its own virtual machine without being affected by any external activity.

Figure 5:
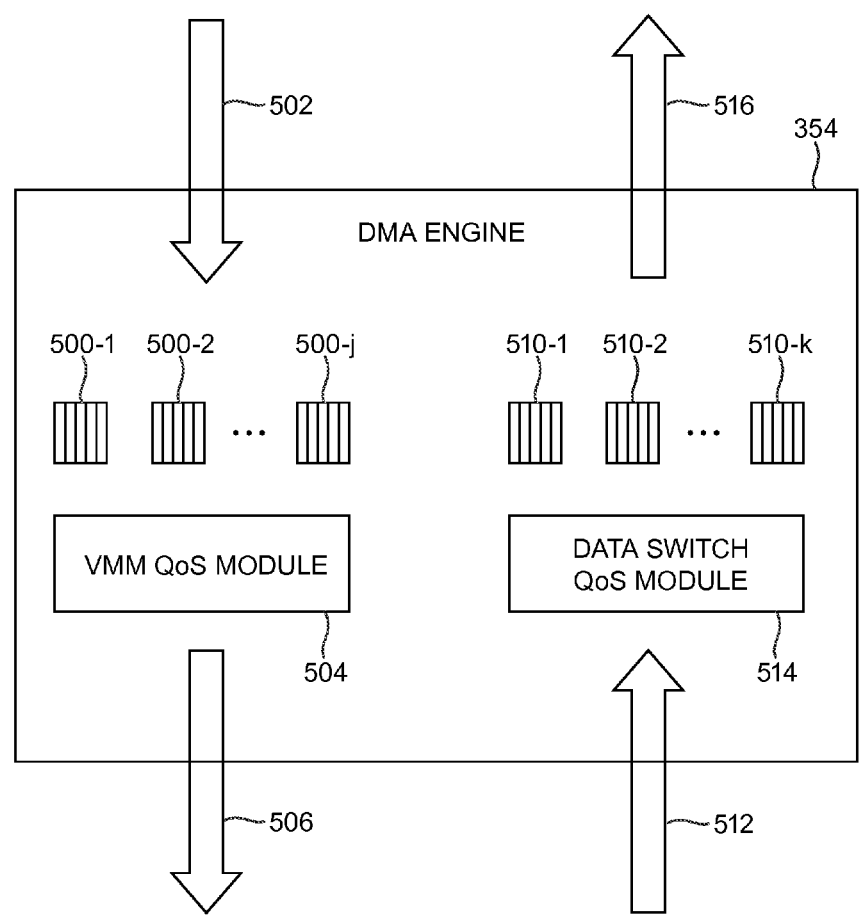
FIG. 5 is a diagram showing how an illustrative direct memory access engine may be provided with a virtual machine (VM) QoS module and a data switch QoS module in accordance with an embodiment.

FIG. 5 is a diagram showing how DMA engine 354 may include multiple virtual machine priority queues such as input (or "inbox") queues 500 and output (or "outbox") queues 510. Input queues 500-1, 500-2, ..., 500-j may each receive requests from a respective virtual machine in the host processor via path 502. As an example, queue 500-1 may be configured to receive access requests from a first virtual machine in the host processor, whereas queue 500-2 may be configured to receive access requests from a second virtual machine that is different than the first virtual machine in the host processor. Each queue 500 may also include multiple sub-queues (sometimes referred to as "channels") for receiving the different CoS requests from a particular host virtual machine.

As shown in FIG. 5, DMA engine 354 may be provided with a virtual machine manager (VMM) QoS module 504 that is configured to prioritize access requests from the different virtual machines. For example, module 504 may determine that requests from a particular virtual machine be processed before processing requests from another virtual machine (e.g., by allowing access requests from a selected one of queues 500 to be passed through to the coprocessor data switching circuitry via path 506). The VMM QoS module 504 may be capable of independently prioritizing the different queues 500 associated with the different virtual machines without being affected by the VM QoS module 402 of FIG. 4.

Output queues 510-1, 510-2, ..., 510-k may each receive different sets of data from the data switching circuitry via path 512. Data received at queue 510-1 may be eventually fed back to a first corresponding virtual machine in the host processor, whereas data received at queue 510-2 may be eventually fed back to a second corresponding virtual machine in the host processor.

In accordance with an embodiment, DMA engine 354 may also be provided with a data switch QoS module 504 that is configured to prioritize data that is being fed back to the virtual machines. For example, module 514 may determine that data in a particular outbox queue 510 be output to the VM space before allowing data from another outbox queue 510 to be output (e.g., by allowing data packets from a selected one of queues 510 to be passed through to the virtual machine circuitry via path 516). The data switch QoS module 514 may be capable of independently prioritizing the k different queues 510 without being affected by the VM QoS module 402 in FIG. 4 or the VMM QoS module 504 in FIG. 5.

Figure 6A:
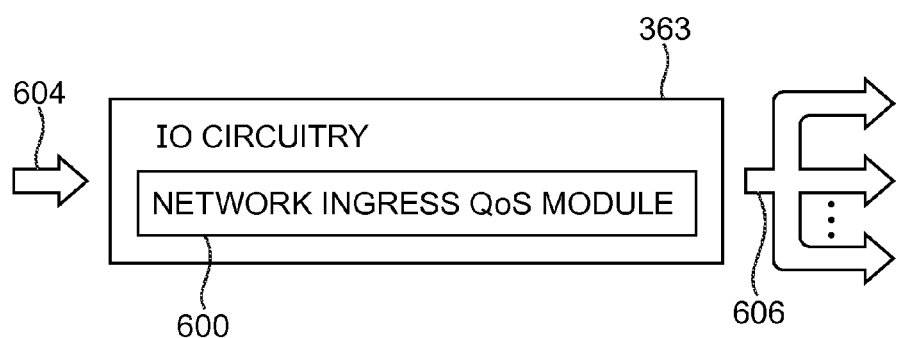
FIG. 6A is a diagram showing how input-output circuitry may be provided with a network ingress QoS module in accordance with an embodiment.

The input-output (IO) circuitry in the coprocessor may also be provided with its own independently operating QoS module. FIG. 6A shows how IO circuitry 363 (i.e., the IO circuitry 362 or 364 in FIG. 3) may be provided with a network ingress QoS module 600. QoS module 600 may be configured to prioritize network packets received via external port 604. In particular, the QoS module 600 may determine the order in which incoming packets are being routed to the internal coprocessor components via paths 606. For example, ingress QoS module 600 may serve to route voice packets to the data switch before routing incoming video packets. As another example, module 600 may serve to route received email packets to the data switch before routing software update settings to the data switch for processing. These examples are merely illustrative. In other suitable arrangements, ingress module 600 may be configured to route incoming packets directly to DMA engine 354, hardware accelerator(s) 366, memory controller 357, and/or other internal circuitry within the coprocessor of FIG. 3.

Figure 6B:
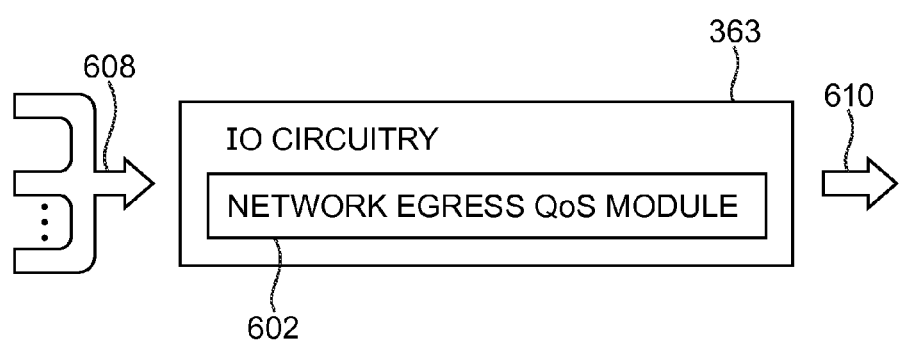
FIG. 6B is a diagram showing how input-output circuitry may be provided with a network egress QoS module in accordance with an embodiment.

FIG. 6B shows how IO circuitry 363 (i.e., the IO circuitry 362 or 364 in FIG. 3) may be provided with a network egress QoS module 602. QoS module 602 may be configured to prioritize network packets that are being output to external port 610 (e.g., to determine the order in which outgoing packets are being routed to the external network port). As shown in FIG. 6B, egress QoS module 602 may receive data packets from various internal components within the coprocessor via paths 608.

For example, egress QoS module 602 may serve to output data packets that has been processed using a first virtual function hardware accelerator before outputting packets provided from a second virtual function hardware accelerator. As another example, egress QoS module 602 may serve to output data packets from the data switch circuitry before outputting data packets retrieved from the coprocessor-attached external memory (e.g., off-chip memory 360 of FIG. 3). These examples are merely illustrative. In other suitable arrangements, egress module 602 may be configured to receive outgoing packets directly from DMA engine 354, hardware accelerator(s) 366, memory controller 357, and/or other internal circuitry within the coprocessor of FIG. 3.

In general, the network ingress and egress QoS modules of FIGS. 6A and 6B may be included simultaneously within the coprocessor (e.g., the ingress and egress QoS modules need not be used separately and can be referred to collectively as a network ingress-egress module). The IO circuitry network ingress and egress modules configured as such may be capable of independently prioritizing network data packets at the network interfacing data ports without being affected by the scheduling decisions of the VM QoS module 402 in FIG. 4, the VMM QoS module 504 in FIG. 5, or the data switch QoS module 514.

Figure 7:
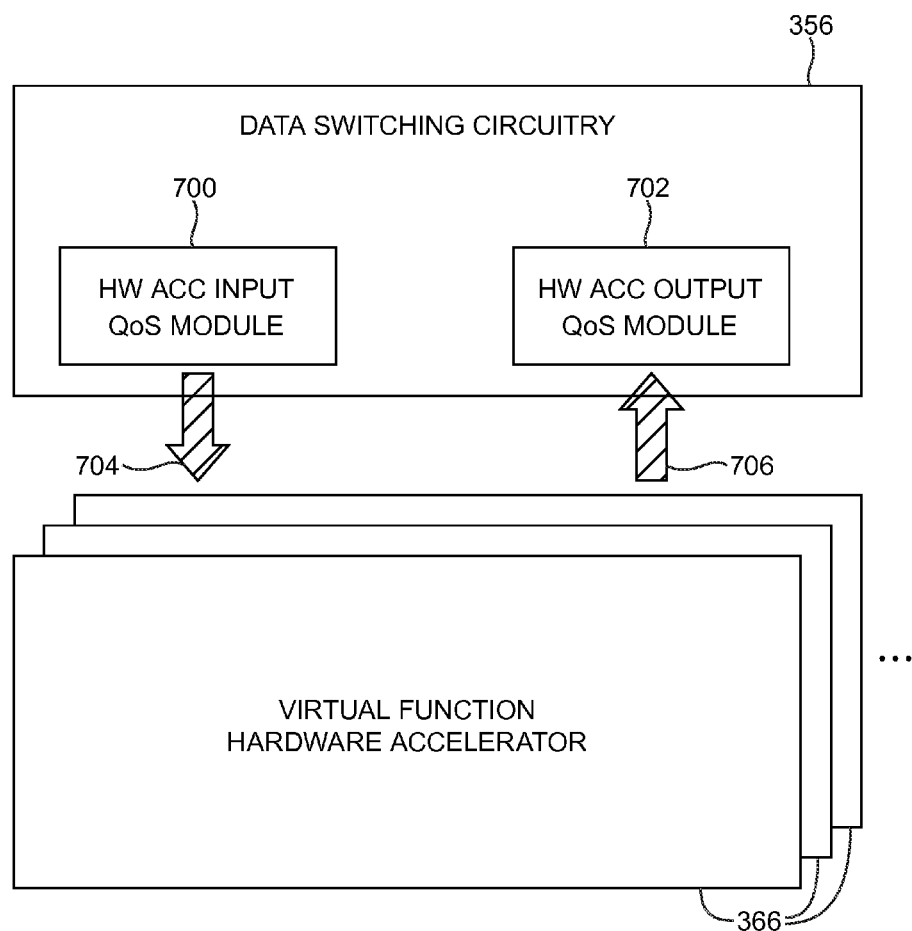
FIG. 7 is a diagram showing how data switching circuitry that interfaces with multiple virtual function hardware accelerators can be provided with a hardware accelerator input QoS module and a hardware accelerator output QoS module in accordance with an embodiment.

In accordance with another embodiment, the data switching circuitry 356 may be provided with priority queuing management modules at the interface with the hardware acceleration circuitry (see, e.g., FIG. 7). As shown in FIG. 7, data switching circuitry 356 may include a hardware (HW) accelerator (ACC) input QoS module and a HW ACC output QoS module 702. In general, each of the HW accelerators 366 provides some specialized functionality. For example, a first accelerator 366 might be more suitable at performing a particular task than a second accelerator 366. If desired, each accelerator 366 may also be configured to perform one or more classes of services.

The accelerator input QoS module 700 may be responsible for priority queuing at the input 704 to the HW accelerators 366. For example, module 700 may serve to determine which HW accelerator to use first for executing a particular task to help optimize network performance (i.e., to ensure high throughput while minimizing delivery time). Similarly, the accelerator output QoS module 702 may be responsible for priority queuing at the output 706 of the HW accelerators 366. For example, module 702 may serve to determine which HW accelerator to receive or latch first in a scenario in which multiple accelerators 366 are outputting data in parallel.

If desired, data switching circuitry 356 need not include both HW ACC input and output QoS modules (e.g., the data switch may include only input QoS module 700 or only output QoS module 702). The HW ACC input/output QoS modules configured as such may be capable of independently prioritizing accesses to the different HW accelerator slices 366 without being affected by the scheduling decisions of the VM QoS module 402 in FIG. 4, the VMM QoS module 504 in FIG. 5, the data switch QoS module 514, or the network ingress/egress QoS modules in FIG. 6.

Figure 8:
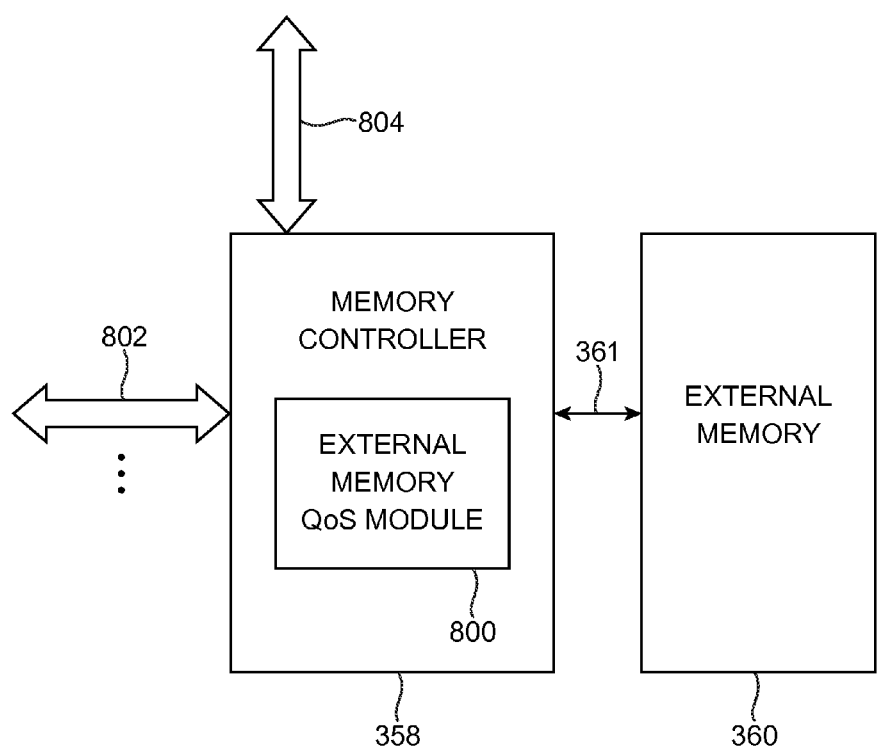
FIG. 8 is a diagram showing how an illustrative memory controller can be provided with an external memory QoS module in accordance with an embodiment.

In accordance with yet another embodiment, the memory controller 358 may be provided with a priority queuing module at interface 361 with the external off-chip memory 360 (see, e.g., FIG. 8). As shown in FIG. 8, memory controller 358 may include an external memory QoS module 800 that is responsible for prioritizing accesses to external memory 360 for data storage.

In the example of FIG. 8, memory controller 358 may be configured to receive memory access requests (e.g., a memory read request or a memory write request) directly from one of the VM hardware accelerators via path 802 or from the data switching circuitry or the DMA engine via path 804. External memory QoS module 800 may serve to determine which memory access requests received from paths 802 and 804 to process first. For example, memory QoS module 800 may determine that access requests from the HW accelerators be processed before those received from the data switch. As another example, memory QoS module 800 may decide that access requests from the DMA engine be processed before those received from the HW accelerator slices. Moreover, the memory QoS module 800 may be capable of scheduling the access requests for a particular source. As an example, off-chip memory QoS module 800 may further reorder the memory access requests received from the data switching circuitry before executing the requests.

The external memory QoS module configured as such may be capable of independently prioritizing accesses to the off-chip memory device 360 without being affected by the scheduling decisions of the VM QoS module 402 of FIG. 4, the VMM QoS module 504 of FIG. 5, the data switch QoS module 514, the network ingress/egress QoS modules of FIG. 6, or the HW ACC input/output QoS modules of FIG. 7.

Figure 9:
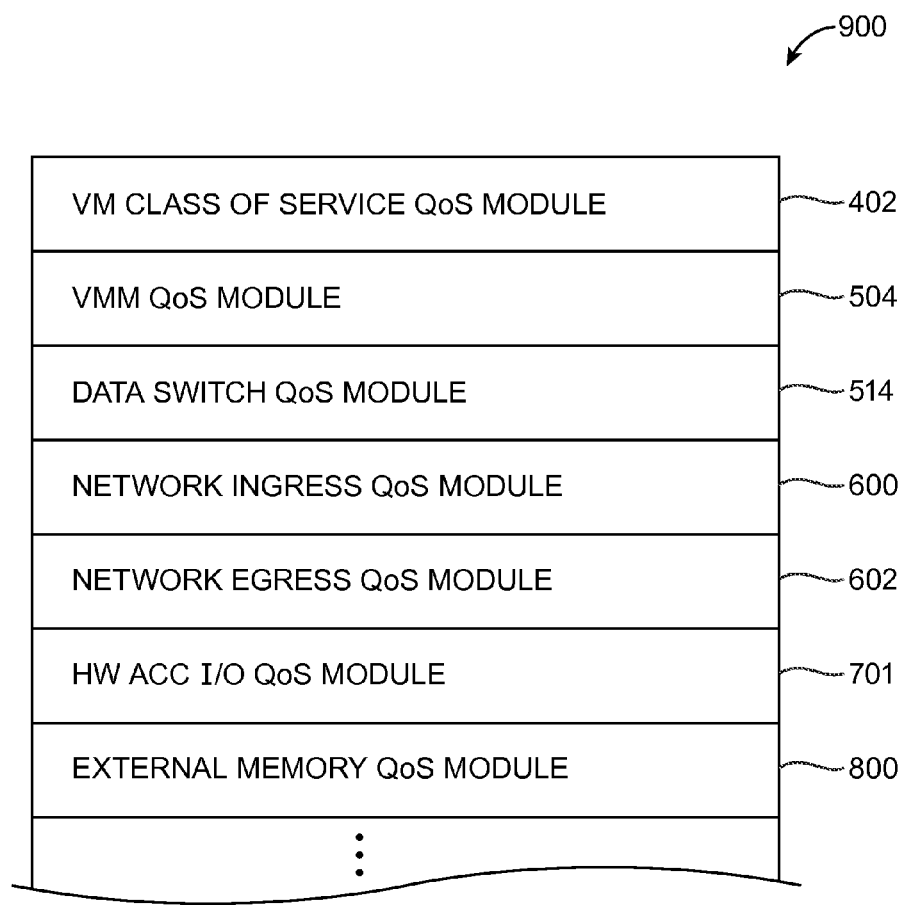
FIG. 9 is a diagram showing an illustrative multilayer QoS that can be used to manage an NFV platform of the type shown in FIG. 3 in accordance with an embodiment.

At least some of the embodiments of FIGS. 4-9 may be included within a single NFV platform (i.e., any suitable combination of the embodiments can be used). FIG. 9 is a diagram that illustrates an exemplary multilayer QoS stack 900 that can be used to manage the NFV system of the type described in connection with FIG. 3. As shown in FIG. 9, multilayer QoS stack 900 may include a VM Class of Service QoS module 402 (e.g., the QoS module of the type described in connection with FIG. 4), a virtual machine manager QoS module 504 (e.g., the QoS module of the type described in connection with FIG. 5), a data switch QoS module 514 (e.g., the QoS module of the type described in connection with FIG. 5), a network ingress QoS module 600 (e.g., the QoS module of the type described in connection with FIG. 6A), a network egress QoS module 602 (e.g., the QoS module of the type described in connection with FIG. 6B), a HW accelerator input/output module 701 (e.g., the HW ACC input and output QoS modules of the type described in connection with FIG. 7), an external memory QoS module 800 (e.g., the off-chip memory QoS module of the type described in connection with FIG. 8), and/or other suitable types of QoS modules.

Each of the different QoS layers in the multilayer stack 900 may be distributed in a different location in the NFV platform and may independently perform its own priority queuing. A hardware accelerated NFV platform configured in this way may therefore be capable of handling requests from multiple sources (e.g., from multiple virtual machines, from coprocessor external ports, etc.) with varying priority levels. The various QoS layers in stack 900 of FIG. 9 are merely illustrative and do not serve to limit the scope of the present invention. If desired, the QoS stack may include less than seven independently operated QoS layers, more than seven independently operated QoS layers, and other suitable types of QoS modules for managing traffic at various internal components of the host processor or the coprocessor.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An integrated circuit, comprising:
   a first circuit that receives service requests from a plurality of virtual machines, wherein the service requests are scheduled using a virtual machine manager (VMM) Quality of Service (QoS) module; and
   a second circuit that receives data packets from an external data port, wherein traffic at the external data port is managed using a network ingress-egress Quality of Service (QoS) module that is different than the virtual machine manager QoS module.

2. The integrated circuit defined in claim 1, wherein the virtual machine manager QoS module operates independently from the network ingress-egress QoS module.

3. The integrated circuit defined in claim 1, wherein the first circuit comprises a direct memory access (DMA) engine.

4. The integrated circuit defined in claim 3, wherein the DMA engine comprises:
   a plurality of input queues that is managed using the virtual machine manager QoS module; and
   a plurality of output queues that is managed using a data switch Quality of Service (QoS) module which operates independently from the VMM QoS module.

5. The integrated circuit defined in claim 1, further comprising:
   data switching circuitry that is coupled to the first circuit and the second circuit and that communicates directly with a plurality of virtual function hardware accelerators within the integrated circuit, wherein communications with the plurality of virtual function hardware accelerators at the data switching circuitry is managed using a hardware accelerator input-output QoS module that operates independently from the virtual machine manager QoS module and the network ingress-egress QoS module.

6. The integrated circuit defined in claim 1, further comprising:
   a memory controller for communicating with an external memory device, wherein memory access requests at the memory controller is prioritized using an external memory Quality of Service (QoS) module that operates independently from the virtual machine manager QoS module and the network ingress-egress QoS module.

7. The integrated circuit defined in claim 1, wherein the plurality of virtual machines is running on an external host processor that is coupled to the integrated circuit and that runs a hypervisor.

8. The integrated circuit defined in claim 1, further comprising:
   programmable logic elements that can be reconfigured to perform different custom functions.

9. A method of managing traffic for a network functions virtualization (NFV) system, comprising:
   using a first Quality of Service (QoS) module to prioritize service requests from at least one virtual machine running on a host processor in the NFV system; and
   using a second Quality of Service (QoS) module to perform priority scheduling independently from the first QoS module, wherein the second QoS is included within a coprocessor that is attached to the host processor in the NFV system.

10. The method defined in claim 9, wherein using the first QoS module comprises using the first QoS module to prioritize service requests from different classes of services from the at least one virtual machine running on the host processor.

11. The method defined in claim 9, wherein using the first QoS module comprises using a virtual machine manager (VMM) QoS module to priority service requests from a plurality of virtual machines running on the host processor.

12. The method defined in claim 10, wherein using the second QoS module comprises:
   using a data switch Quality of Service (QoS) module to prioritize data that is being fed back to the plurality of virtual machines.

13. The method defined in claim 10, wherein using the second QoS module comprises:
   using a network ingress Quality of Service (QoS) module to manage incoming traffic at an external data port of the coprocessor; and
   using a network egress Quality of Service (QoS) module to manage outgoing traffic at the external data port of the coprocessor.

14. The method defined in claim 10, wherein using the second QoS module comprises:
   using a hardware accelerator input Quality of Service (QoS) module to manage incoming traffic to a plurality of hardware accelerators in the coprocessor; and
   using a hardware accelerator output Quality of Service (QoS) module to manage outgoing traffic produced from the plurality of hardware accelerators in the coprocessor.

15. The method defined in claim 10, wherein using the second QoS module comprises:

using an external memory Quality of Service (QoS) module to prioritize memory accesses to an off-chip memory device that is directly attached to the coprocessor.

16. A Network Functions Virtualization (NFV) platform, comprising:
 a host processor having a hypervisor that creates and runs virtual machines; and
 a coprocessor having accelerators for accelerating the performance of the virtual machines, wherein the host processor and the coprocessor includes a multilayer Quality of Service (QoS) manager having a plurality of independently operating QoS modules distributed throughout the NFV platform.

17. The NFV platform defined in claim 16, wherein the plurality of QoS modules includes at least seven independently operated QoS modules.

18. The NFV platform defined in claim 16, wherein the plurality of QoS modules includes a Class of Service (CoS) QoS module that prioritizes service requests from at least one of the virtual machines running on the host.

19. The NFV platform defined in claim 16, wherein the plurality of QoS modules includes a virtual machine manager (VMM) QoS module to priority service requests from the virtual machines running on the host processor.

20. The NFV platform defined in claim 16, wherein the plurality of QoS modules includes a data switch QoS module to prioritize data that is being fed back from the coprocessor to the virtual machines on the host processor.

21. The NFV platform defined in claim 16, wherein the plurality of QoS modules includes a network ingress-egress QoS module for managing traffic at an external data port of the coprocessor.

22. The NFV platform defined in claim 16, wherein the plurality of QoS modules includes a hardware accelerator QoS module for managing traffic with a plurality of hardware accelerators in the coprocessor.

23. The NFV platform defined in claim 16, wherein the plurality of QoS modules includes an external memory QoS module for prioritizing memory accesses to an off-chip memory device that is directly attached to the coprocessor.

* * * * *